Nov. 10, 1959 L. Z. LA FOREST 2,912,295

RECORD SUPPORT AND LOADING APPARATUS
FOR SHEET RECORD MACHINE
Filed Aug. 18, 1954

INVENTOR
Louis Z. La Forest
BY
George H. Fritzinger
Agt.

United States Patent Office 2,912,295

Patented Nov. 10, 1959

2,912,295

RECORD SUPPORT AND LOADING APPARATUS FOR SHEET RECORD MACHINE

Louis Z. La Forest, Parsippany, N.J., assignor, by mesne assignments, to McGraw-Edison Company, Elgin, Ill., a corporation of Delaware Application August 18, 1954, Serial No. 450,759

7 Claims. (Cl. 346—138)

This invention relates to a machine in which flexible sheet records are mounted removably on a revolvable support having an endless record-supporting surface, and is particularly concerned with a novel construction of such support and with novel apparatus for facilitating the loading and unloading of a sheet record onto and from the support.

The present invention is adapted especially for use with magnetic recording and reproducing machines which employ a thin, flexible sheet record coated with magnetizable particles and wrapped through substantially at least one full revolution around the record support with the leading edge thereof attached to the support to provide for drive of the sheet record therewith. In such machines a magnetic head is propelled slowly across the record support as the latter is rotated to cause the head to scan a helical track on the sheet with repeated crossing of the joint between the leading and trailing edges thereof. When the sheet record is removed from the support and is laid out flat, the scanning track appears as a series of side-by-side parallel lines.

It is necessary that the sheet record be placed accurately on the support so that the individual parallel lines will re-form a continuous helical track when the sheet record is mounted on a machine for playback or transcription. An object of my invention is to provide a novel means for securely attaching and accurately positioning the sheet record on the support wholly by engagement of the support with the leading end portion of the sheet.

Another object is to provide an openable and closable sheet-record attaching means which confines the leading edge of the sheet record in a slot in a record support to eliminate need for an overlapping trailing edge.

Another object is to provide a record-supporting drum which is openable on a peripheral line lengthwise of the drum to receive the leading edge of the sheet record.

Another object is to guide the sheet record into a loading position for attachment to the record support, and to permit opening and closing of the sheet-record attaching means only when the support is oriented to place its attaching means at that loading position.

Other objects are to provide a record-supporting drum having an openable slot for receiving the leading edge of the sheet record, and to permit opening of the slot only when it is aligned with the guide for directing the sheet record into loading position.

Other objects are to provide a lock operable to hold the record support against rotation only when the sheet-record attaching means is at loading position, to provide in sequence for movement of a normally-inoperative sheet-record stripping member into effective position and thereupon for reverse movement of the support through substantially one revolution as an incident precedent to locking the support.

Other objects are to control the sheet-record attaching means, the lock for the record support and the sheet-record stripping member, as well as to provide for a reverse rotation of the support, all through axial and rotational manipulation of a single control knob on the record support.

Still other objects and features of the invention will be apparent from the following description and the appended claims.

In the description of my invention reference is had to the accompanying drawings, of which:

Figures 1, 2:
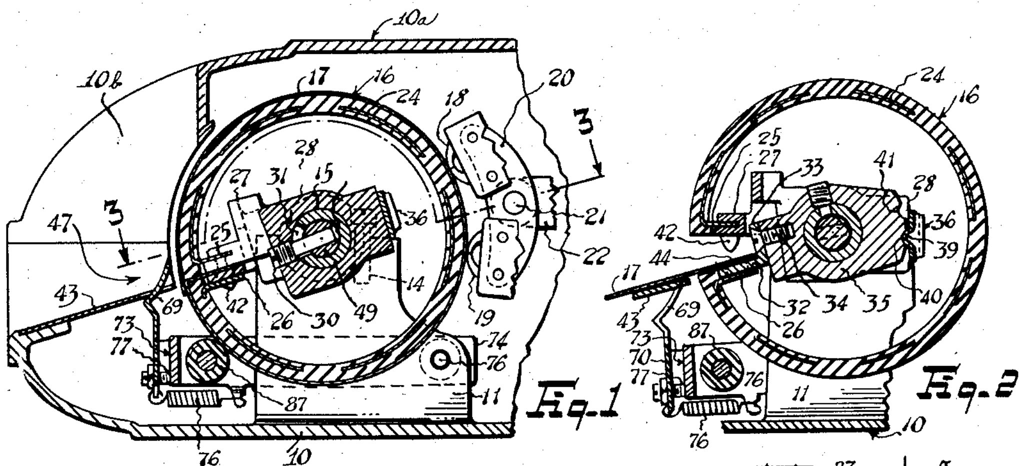
Figure 1 is a fractional, vertical section of a magnetic-type dictation recording and reproducing machine embodying my invention and taken substantially on the line 1—1 of Figure 3.
Figure 2 is a similar sectional view taken on the line 2—2 of Figure 3 and showing the sheet-record attaching means in open condition.

The sheet-record magnetic recording and reproducing machine fractionally shown in the drawings may comprise a base plate 10 and an upper housing section **10*b*. The base plate 10 is provided with laterally-spaced, vertical standards 11 and 12. Mounted on the upper ends of these standards are left and right bearings 13 and 13*a* held in place by screws 14. These bearings receive a transverse shaft 15 for a record-supporting drum 16. This drum carries a sheet record 17 comprising a flexible backing film coated with magnetic particles such as is well known in the art. The leading edge of the sheet record is secured to the drum for drive of the sheet record therewith in wrap-around relation thereto as the drum is rotated in an advancing clockwise direction. Engaging the sheet record are vertically-aligned erase and record-reproduce heads 18 and 19 mounted on opposite ends of a vertical rocker beam 20 as fractionally shown. This beam is pivoted at its center, as at 21, to a carriage 22 only frictionally indicated. It is understood that the carriage is mounted for transverse traveling movement along the drum and that it is so progressively moved during rotation of the drum as by means of a feed screw (not shown) geared to the drum through suitable gearing fractionally indicated at 22*a*** in Figure 3. Accordingly, the heads engage the rotating sheet record along a helical track while the sheet record is mounted on the drum, but when the sheet record is removed and laid out flat this track appears as a series of parallel lines. Since the present invention is concerned with the construction of the drum and the attachment and detachment of a sheet record to and from the drum, apparatus of the machine other than that particularly relating to the invention need not be herein further described.

By way of illustrative example, the drum 16 may comprise a cylindrical wall 23 of resilient material such as rubber or plastic. This wall may be molded to shape onto a reenforcing metal screen 24 to provide it with the desired strength and resilience. The screen is embedded in the wall 23 except at two adjacent points where the ends of the screen project inwardly of the drum to form exposed metal lugs 25 and 26. Between these lugs the resilient wall 23 has a break on a line lengthwise of the drum to permit opening of the drum at this line as will appear. Fitting the upper lug 25 of the screen (Figures 1 and 3) are two slotted bars 27 extending lengthwise of the drum and formed integrally with a hub 28, the bars being separated from each other at the center of the drum only to provide access to a screw 30 in the hub. The hub 28 embraces the shaft 15 and is permitted to have a small degree of rotational movement with respect thereto, the limits of which are defined by the engagement of the screw 30 with a slot 31 in the shaft 15 (Figure 1). The other lug 26 of the screen 24 is welded to a bar 32 extending lengthwise of the drum and having two turned-up lugs 33 secured respectively by screws 34 to collars 35 positioned on the shaft 15 at opposite sides of the hub 28. These collars are secured rigidly to the shaft 15 by respective set screws 35*a*. Thus, upon angularly shifting the hub 28 on the shaft 15, the drum can be opened and closed at the break line aforementioned.

Figure 3:
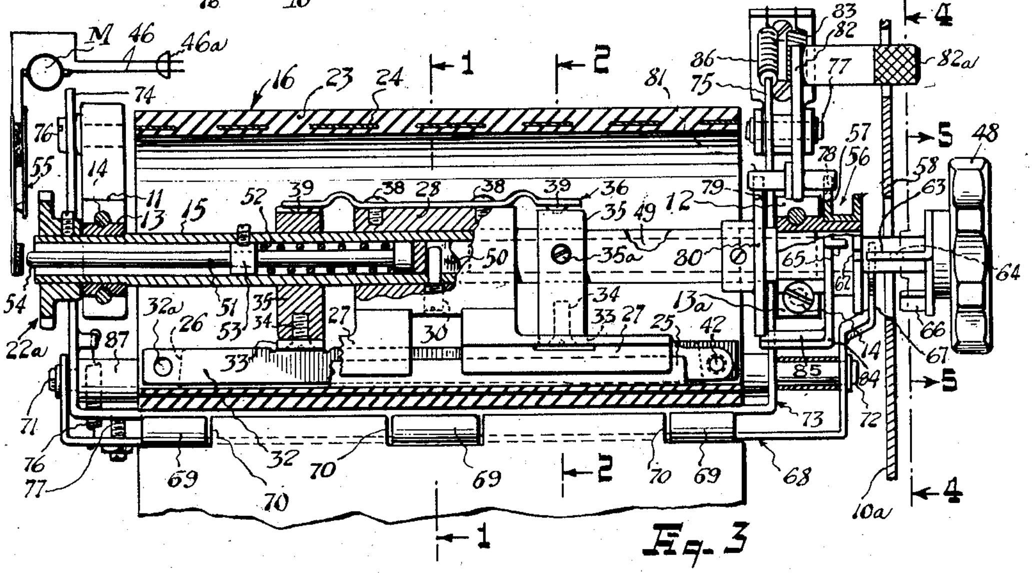
Figure 3 is a horizontal view with parts in section on the line 3—3 of Figure 1.

The resilience of the wall 23 and screen 24 may be such as to normally hold the drum closed, but detents are provided to releasably retain the drum in its open and closed positions. These detents comprise a strip 36 of spring material secured by screws 38 to the hub 28, which strip has cantilever end portions overhanging the sides of the hub and provided with ball points 39. These ball points engage the periphery of the collars 35 as indicated in Figure 3. In each collar there are two peripheral notches 40 and 41 positioned respectively for registration with the ball points 39 when the drum is open and closed. The engagement of the ball points with the notches 40 and 41 is sufficient to releasably hold the drum in its respective open and closed positions, but in view of the natural resilience of the drum tending to hold it closed, the detenting of the drum in closed position is desirably with greater retaining force than it is in open position.

When the drum is open two or more pins 42, which project downwardly from the ends of the bars 27, are exposed as shown in Figure 2. The leading edge of the sheet record 17 is inserted into the open slot of the drum as by way of a guide plate 43 and side wall 10*b* until it abuts against the lugs 33 at the inner end of the open slot in the drum. In the leading end portion of the sheet record there are holes 44 positioned for registration with the pins 42. When the drum is closed the pins 42 pass through these holes of the sheet record and engage respective holes 32*a* in the bar 32 to attach the sheet record to the drum. Since the leading end portion of the sheet record becomes concealed within the drum, it may be engaged by any desired number of pins distributed along the length of the drum to provide a firm connection and accurate location of the sheet record with respect to the drum solely by the attachment of the drum to the leading edge of the sheet.

As the drum rotates in its advancing clockwise direction, the sheet is wrapped therearound and provided with circumferential freedom from its leading edge. The trailing edge may overlap the leading corner of the sheet record where the sheet record emerges from the drum, but an overlap is not necessary since the leading edge is not exposed. The front location above the guide plate 43 and to the right of the side plate 10*b* where the machine is loaded with a sheet record is herein referred to as a loading station 47. On the shaft 15 at the right end of the drum there is a knob 48. This knob is utilized both for turning the drum and for opening it, but the latter operation requires both rotational and lateral shifting of the knob, as will appear. The shifting movement is made possible by making the shaft 15 tubular and mounting the knob on a rod 49 which telescopes into the tubular shaft. The rod 49 extends through a major portion of the length of the drum and has a transverse slot 50 in its inner end portion received by the pin 30 for the purpose of connecting the knob 48 to the trailing end portion of the circular wall 23 of the drum, the connection being by way of the lug 25, hub 28, pin 30 and rod 49. The knob 48 is biased into its outermost position by a plunger 51 in the tubular shaft 15, which plunger is spring-pressed to the right by a compression spring 52 interposed between the plunger and a stop collar 53. However, the slot 50 is extended lengthwise of the rod, as shown in Figure 3, to permit the knob 48 to be shifted inwardly. The end 54 of the plunger projects beyond the tubular shaft 15 to operate a master switch 55 controlling a drive motor M for the machine, the motor being connected in a power circuit 46 connectable by a plug 46*a* to a source of power. Alternatively, the plunger 51 may connect to other control apparatus to perform any other desired control operation on the machine as the knob 48 is shifted inwardly.

Figure 4:
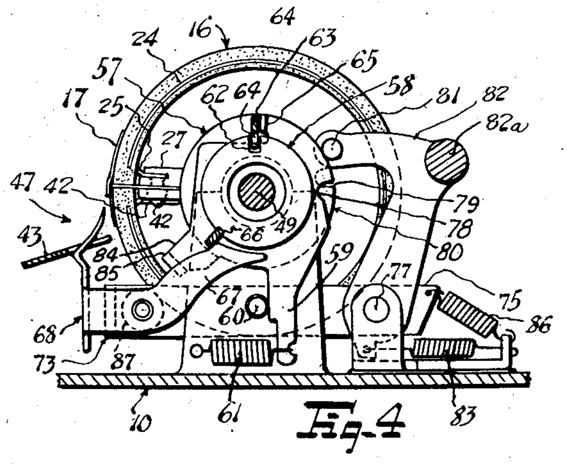
Figure 4 is a fractional, vertical section taken substantially on the line 4—4 of Figure 3 and showing the sheet-record attaching means closed.
Figure 5:
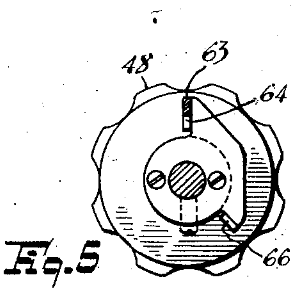
Figure 5 is a fractional, vertical section taken substantially on the line 5—5 of Figure 3.

Mounted pivotally on a rightward tubular extension of the bearing 13*a* is a spool 56 having inner and outer flanges 57 and 58. The inner flange 57 is non-circular and is provided, among other elements, with a depending arm 59 which bears normally against a stop pin 60 under force of a tension spring 61 which urges the spool clockwise as it appears in Figure 4. The outer flange 58 is shown as being circular but is provided with a notch 62 to permit the knob 48 to be pressed inwardly only when the knob is turned to align a lug 63 on the knob with the notch 62. The lower edge of this lug has a notch 64 spaced from the end of the lug by the distance between the flanges of the spool. The purpose of the notch 64 is to allow the knob to be turned in a counterclockwise direction after it has been depressed into its innermost position, there being a stop lug 65 on the inner flange 57 immediately clockwise from the position of the lug when it passes through the notch 64 to prevent clockwise rotation of the knob when depressed. Upon only slightly turning the knob 48 counterclockwise after the knob is depressed, the knob becomes locked in its innermost position by the inter-engagement of the flange 58 with the notch 64. During all turning movement of the knob the drum is turned correspondingly. The purpose of the lug 63 and notched flange 58 is to establish the starting position of the drum from which it can be reversely rotated while the knob 48 is depressed. This starting position is one whereat the break line in the drum is at the most advanced end of the loading station as with respect to the direction of advance of the drum, as shown in Figure 4.

At the front of the machine below the guide plate 43 there is a sheet-record stripping member 68 having three fingers 69 projecting upwardly through corresponding clearance slots 70 in the guide plate. This stripping member is in the form of a long bail extending lengthwise of the drum and having left and right mounting arms pivoted at 71 and 72 to the forward end portion of a second bail 73. The second bail has left and right horizontally-disposed arms 74 and 75 pivoted at their rearward ends, at 76 and 77 respectively, to standards upstanding from the base plate. The reason for mounting the stripper bail on the shiftable bail 73 is to provide for a vertical shifting of the stripping member as will appear. The rightward arm of the stripping member 68 has an extension beyond its pivot center forming a cam finger 67. This cam finger terminates in proximity with the right flange 58 of the spool 56. When the drum is located in its starting position described in the foregoing paragraph, a second inwardly-extending lug 66 on the knob 48 is positioned just clockwise from this cam finger. In the initial counterclockwise movement of the knob 48 while in its inner position, the lug 66 impinges against the finger 67 and cams the stripping member 68 clockwise to shift the fingers 69 from their outermost inoperative positions—which they normally occupy by reason of a spring-biasing of the stripping member provided by spring 76 urging the stripping member counterclockwise against a stop 77 shown in Figures 1 and 3—into at least close proximity to the drum. This inward shifting of the stripping fingers occurs before they reach the trailing edge of the sheet record in the reverse rotation of the drum, with the result that the stripping fingers pass below the trailing edge and strip the sheet record from the drum during the continuing reverse rotation of the drum by the knob 48. Although the lug 66 soon passes the cam finger 67 to allow the stripping fingers to shift away from the drum, the fingers remain effective after the stripping is once started to continue to perform their stripping action.

When the knob 48 has been reversely rotated through a distance just short of one revolution while in its inner, depressed position, the lug 63 comes to the other side of the stop lug 65 on the flange 57. Since in this position of the knob 48 to the spool 56 the lug 63 is short of reaching the notch 62, the knob continues to be retained in its inner, depressed position. When the lug 63 contacts the stated other side of the stop lug 65, a notch 78 in the flange 57 is in alignment axially of the drum with a similar notch 79 in a disc 80 which is rigidly secured to the shaft 15 of the drum. Upon continued reverse rotation of the knob 48 the spool 56 is turned therewith against the resisting force of the tension spring 61. When, in the continued reverse rotation, the break line of the drum reaches the guide plate 43—which occurs when the drum has ben reversely rotated from its starting position of Figure 4 through a little more than one revolution—the aligned notches 78 and 79 register with opposite ends of a latch pin 81. This pin is mounted on a bell crank lever 82 pivoted at 77 and is urged by a spring 83 against the peripheral edge of the flange 57. Thus, when the break line of the drum registers with the guide plate 43, the latching pin engages the notches 78 and 79 to lock the drum. Upon the dictator next turning the knob 48 clockwise, the drum is forced open to take the position shown in Figure 2. Since the sheet record has been stripped from the drum during the reverse rotation preceding the opening thereof, the dictator need only to disengage the sheet from the pins 42 to free it from the machine.

The position of the drum shown in Figure 2 is also its loading position. Since the stripping fingers 69 must be removed from the path of the sheet record across the guide plate 43 into the slot of the drum during the loading operation, a mechanism is provided to remove the stripping fingers into their downward position shown in Figure 2 during that final reverse rotation of the drum in which the spool 56 is moved therewith. For this purpose an arm 84 depends from the flange 57 of the spool and is provided with a transverse lug 85 overlying the right arm 75 of the bail 73 carrying the stripping member. The bail 73 is biased into its uppermost position by a tension spring 86. This position is defined by contact with the drum of a transverse roller 87 journalled at its ends in the arms of the bail 73. As the spool 56 is turned counterclockwise into its latched position during the final reverse rotation of the drum to strip the sheet therefrom, the lug 85 impinges against the arm 75 and shifts the bail 73 downwardly to place the stripping fingers below the level of the guide plate 43 as shown in Figure 2. Since the spool 56 becomes latched at the end of the stripping operation it remains effective to retain the bail 73 in its downmost position against the upward biasing effect of the spring 86.

When a new sheet record is to be mounted, it is slid over the guide plate 43 into the open slot of the drum until the leading edge abuts the stop lugs 33. The knob 48 is turned counterclockwise to snap the drum closed and bring the teeth 42 into engagement with the holes in the sheet record (it being understood that the drum is still locked against rotation), the latch 81 for the drum is released by shifting the lever 82 rearwardly as by means of a short fingerpiece **82*a* extending to the right thereof, and the knob 48 is turned clockwise to wrap the sheet record around the drum. When the sheet has become wrapped around the drum the lug 63 reaches the notch 62 and allows the knob 48** to snap outwardly from its inner, depressed position to restore the machine for normal operation on the mounted sheet record.

The embodiment of my invention herein particularly shown and described is intended to be illustrative and not limitative of my invention since the same is subject to changes and modifications without departure from the scope of my invention, which I endeavor to express according to the following claims.

I claim:

1. A rotatably-mounted record support having an endless peripheral surface for carrying a flexible sheet record in wrap-around relation to the support, a journalled shaft carrying said support, said support comprising coactable peripheral elements openable on a line parallel with said shaft to provide a slot for receiving the leading edge of the sheet record, a knob on said shaft for turning the support by hand, means mounting said knob for axial shifting movement on said shaft, means effective when said knob is in one of its shifted positions for limiting reverse rotation of said support by the knob to substantially one revolution; and means operable by rotation of said knob in said one shifted position when said support is in said limited postion for opening said peripheral elements.

2. The combination set forth in claim 1 including a movable stripper element normally positioned away from said support and movable into proximity therewith to strip the sheet record from the support as the support is reversely rotated, and means for shifting said stripper element into proximity with said support by said knob as the knob is reversely rotated while the same is in said one of its shifted positions.

3. In a machine having a revolvable cylindrical support with an endless supporting surface for carrying a flexible sheet record in wrap-around relation thereto: the combination of a shaft for said support journalled to permit rotation of the support about its axis, a closable sheet-record attaching means on said support for securing the leading edge of the sheet record to the support, a knob on said shaft in concentric relation to said support for turning the support by hand, means mounting said knob for shifting movement along said shaft, and means operable by said knob in response to rotational and axial shifting movement thereof for closing said attaching means.

4. In a machine having a revolvable record support with an endless supporting surface for carrying a flexible sheet record in wrap-around relation thereto: the combination of a sheet-record attaching means on said support for securing the leading edge of the sheet record to said support, a loading station including guide means for directing the sheet record into loading position for attachment to said support, a movable stripper element normally positioned away from said support and shiftable theretowards into effective position to strip the sheet record from said support as the support is reversely rotated, a movable control member, and means operable by said control member to shift said stripping element into effective position, to reverse said support through substantially one revolution, and to lock said support in the sequence here named.

5. In a machine having a revolvable record support with an endless supporting surface for carrying a flexible sheet record in wrap-around relation thereto: the combination of an openable sheet-record attaching means on said support for securing the leading edge of the sheet record to said support, a loading station including guide means for dirercting the sheet record into loading position for attachment to said support, a movable stripper element normally positioned away from said support and shiftable theretowards into effective position to strip the sheet record from said support as the support is reversely rotated, said stripping element normally crossing the path of the sheet record into its loading position for attachment to said support, and means for shifting said stripping element out of said path and opening said attaching means in one operation.

6. A rotatably-mounted record-supporting drum for carrying a flexible sheet record in wrap-around relation thereto, said drum having a cylindrical, peripheral wall of yieldable material having a break therein to provide it with abutting edges on a line parallel to the axis of rotation of the drum, said abutting edges being normally contiguous under influence of the natural resilience of said peripheral wall, means mounting said edges for relative movement about the axis of said drum to permit said edges to be separated to provide a slot for receiving the leading edge of the sheet record, respective means coupled to said edges for relatively moving the same to provide for opening and closing of said slot, and detent means operatively interposed between said last stated means and rendered operative by the opening of said slot for releasably retaining said edges in separated positions.

7. In a machine having a revolvable record support with an endless supporting surface for carrying a flexible sheet record in full wrap-around relation thereto: the combination of a sheet-record attaching means on said support for securing the leading edge of the sheet record to said support, a loading station including guide means for directing the sheet record into loading position for attachment to said support, means for advancing said support after attachment of said sheet record thereto to cause the sheet record to be wrapped around said support, a stripping member mounted adjacent to said support for engaging the underside of the trailing portion of a mounted sheet record to strip the record from the support as the support is reversely rotated, means for locking the support against rotation in a position wherein said attaching means is at said loading station, means for reversely rotating said support, and means rendered operative by reverse rotation of said record support through at least substantially one full revolution from a position whereat the stripping member engages the under side of the trailing portion of a mounted sheet record to a subsequent position whereat said attaching means is at said loading station for rendering said locking means effective.

References Cited in the file of this patent

UNITED STATES PATENTS

| | | |
|---|---|---|
| 614,644 | Barr | Nov. 22, 1898 |
| 927,926 | Ballard | July 13, 1909 |
| 2,093,385 | Storck | Sept. 14, 1937 |
| 2,172,113 | Storck et al. | Sept. 5, 1939 |
| 2,231,109 | Breuer et al. | Feb. 11, 1941 |
| 2,514,974 | Schauer | July 11, 1950 |
| 2,592,379 | Barney | Apr. 8, 1952 |
| 2,622,000 | Thompson | Dec. 16, 1952 |
| 2,666,808 | Cooley | Jan. 19, 1954 |
| 2,672,346 | Roberts | Mar. 16, 1954 |
| 2,695,785 | Dashiell et al. | Nov. 30, 1954 |
| 2,717,549 | Keil | Sept. 13, 1955 |

FOREIGN PATENTS

| | | |
|---|---|---|
| 55,552 | Netherlands | Oct. 16, 1943 |